(12) United States Patent
Wang et al.

(10) Patent No.: US 9,955,210 B2
(45) Date of Patent: Apr. 24, 2018

(54) MULTIMEDIA DEVICE VOICE CONTROL SYSTEM AND METHOD, AND COMPUTER STORAGE MEDIUM

(71) Applicant: Shenzhen Prtek Co. Ltd., Shenzhen (CN)

(72) Inventors: Hongzhi Wang, Shenzhen (CN); Leyuan Liu, Shenzhen (CN); Nong Sang, Shenzhen (CN); Guohua Liu, Shenzhen (CN)

(73) Assignee: SHENZHEN PRTEK CO. LTD., Shenzhen (CN)

( * ) Notice: Subject to any disclaimer, the term of this patent is extended or adjusted under 35 U.S.C. 154(b) by 0 days.

(21) Appl. No.: 14/421,900

(22) PCT Filed: Sep. 26, 2013

(86) PCT No.: PCT/CN2013/084348
§ 371 (c)(1),
(2) Date: Feb. 16, 2015

(87) PCT Pub. No.: WO2014/048348
PCT Pub. Date: Apr. 3, 2014

(65) Prior Publication Data
US 2015/0222948 A1 Aug. 6, 2015

(30) Foreign Application Priority Data

Sep. 29, 2012 (CN) .......................... 2012 1 0374809

(51) Int. Cl.
*H04N 21/422* (2011.01)
*H04N 21/4415* (2011.01)
(Continued)

(52) U.S. Cl.
CPC ......... *H04N 21/42203* (2013.01); *G06F 3/01* (2013.01); *G06F 3/167* (2013.01);
(Continued)

(58) Field of Classification Search
CPC . G08C 2201/31; G08C 2201/32; G10L 15/24; G10L 15/22; G10L 15/20;
(Continued)

(56) References Cited

U.S. PATENT DOCUMENTS 6,243,683 B1 6/2001 Peters
7,538,711 B2 * 5/2009 Chung ................. H04N 5/4403
340/12.22
(Continued)

FOREIGN PATENT DOCUMENTS

CN 1397063 A 2/2003
CN 201115599 Y 9/2008
(Continued)

*Primary Examiner* — Hai V Tran
(74) *Attorney, Agent, or Firm* — Coats & Bennett, PLLC

(57) ABSTRACT

A voice control system and method for a multimedia device are provided. The system includes an image sensing module configured to collect a user action image; an image recognizing module configured to determine a type or a status of a control instruction according to the user action image; a voice recognition status managing module configured to activate or wake up the voice recognition program according to a type of a current control instruction; a pickup module configured to collect voice signal; a voice recognizing module configured to recognize the collected voice data to generate a control instruction; and a multimedia function module configured to execute the control instruction to provide a corresponding multimedia function to the user. An image recognition technology, a voice recognition technology, and a storage medium of a computer are combined in the illustrated embodiment, a free and convenient voice control which is not depended on a hand-held remote control unit and not limited to a close pickup device is achieved. The interference of the sound output by the multimedia device, the environment background noise, and a non-control instruction voice signal of the user to the control instruction (Continued)

voice recognition can be effectively avoided, the instruction of the user can be precisely recognized.

12 Claims, 5 Drawing Sheets

(51) Int. Cl.
*H04N 21/442* (2011.01)
*H04N 21/47* (2011.01)
*G06F 3/01* (2006.01)
*H04N 21/4223* (2011.01)
*H04N 21/44* (2011.01)
*G10L 15/22* (2006.01)
*G06F 3/16* (2006.01)

(52) U.S. Cl.
CPC ......... *G10L 15/22* (2013.01); *H04N 21/4223* (2013.01); *H04N 21/44008* (2013.01); *H04N 21/4415* (2013.01); *H04N 21/44218* (2013.01); *H04N 21/47* (2013.01)

(58) Field of Classification Search
CPC .............. G10L 17/22; H04N 21/42203; H04N 21/42222; H04N 21/43615; H04N 21/4223; H04N 21/44008; H04N 21/44218; H04N 5/4403; H04N 21/4415; G06F 3/017; G06F 3/167; B60R 16/0373; G01C 21/365; G01S 5/20
See application file for complete search history.

(56) References Cited

U.S. PATENT DOCUMENTS

| | | | |
|---|---|---|---|
| 7,797,635 B1* | 9/2010 | Denise | G06F 17/30864 707/706 |
| 8,762,145 B2* | 6/2014 | Ouchi | G01S 3/80 704/233 |
| 2002/0167862 A1* | 11/2002 | Tomasi | G01S 5/18 367/118 |
| 2003/0069733 A1* | 4/2003 | Chang | B60R 16/0373 704/275 |
| 2003/0138118 A1 | 7/2003 | Stahl | |
| 2005/0086056 A1 | 4/2005 | Yoda et al. | |
| 2007/0233321 A1 | 10/2007 | Suzuki | |
| 2009/0164938 A1* | 6/2009 | Wang | G06F 1/1601 715/803 |
| 2011/0282673 A1 | 11/2011 | Di Profio et al. | |
| 2011/0313768 A1 | 12/2011 | Klein et al. | |
| 2011/0314381 A1* | 12/2011 | Fuller | G06F 3/017 715/727 |
| 2012/0215537 A1 | 8/2012 | Igarashi | |
| 2013/0169884 A1* | 7/2013 | Huang | H04N 21/42203 348/738 |

FOREIGN PATENT DOCUMENTS

| | | |
|---|---|---|
| CN | 102306051 A | 1/2012 |
| CN | 102682770 A | 9/2012 |
| CN | 102945672 A | 2/2013 |
| JP | 6239747 A | 8/1987 |
| JP | 2004514926 A | 5/2004 |
| JP | 2007094104 A | 4/2007 |
| JP | 2007142957 A | 6/2007 |
| JP | 2011061461 A | 3/2011 |
| JP | 2011257943 A | 12/2011 |
| WO | 2011055410 A1 | 5/2011 |
| WO | 2011163538 A1 | 12/2011 |
| WO | 2012070812 A2 | 5/2012 |
| WO | WO 2012091185 A1 * | 7/2012 ............ G06F 3/017 |

* cited by examiner

MULTIMEDIA DEVICE VOICE CONTROL SYSTEM AND METHOD, AND COMPUTER STORAGE MEDIUM

FIELD OF THE INVENTION

The present invention relates to voice remote control technologies, and more particularly relates to a voice control system and method for a multimedia device, and a computer storage medium.

BACKGROUND OF THE INVENTION

After a mobile phone is intellectualized, it is a trend that multimedia devices such as the TV, projector, game console will also be intellectualized. Currently, a multimedia device is often equipped with a high performance controlling chip, and has an open platform and an operating system. A user can install and uninstall apps, the apps have extended functions of the multimedia device. The multimedia device supports the SNS and information exploring. Take a smart TV as an example, the smart TV is not limited to a conventional function of playing programs. The smart TV can realize functions of sharing video and audio, playing interactive entertainment games. A conventional button type remote control unit cannot fulfill requirements of selecting and operating several multimedia functions.

In the prior art, intelligent controlling can be achieved through several human computer interaction programs such as touching controlling, voice controlling, gesture controlling, motion controlling etc. Because of limitations of a usage scenario and problems of a usage habit, the conventional intelligent controlling method cannot totally replace the button type remote control unit, the user can operate only by utilizing combinations of specific functional keys and digital keys on the button type remote control unit. For example, the touch controlling program needs to use a touch sensing module installed on the remote control unit. The gesture recognition program cannot switch a channel among the usually used channels quickly, if the user wants to change from current channel 1 to channel 55, the conventional button type control unit will change the channels much quicker than that of the gesture recognition program. The problem of motion controlling is similar as that of the gesture recognition program, usually, the motion controlling program needs to install a range image sensing module to achieve a precise motion controlling function. The problem of the conventional voice recognition program is: in order to collect the voice of the user clearly, a microphone is installed on the remote control unit, the conventional button type remote control unit is needed.

With the development of the voice recognition, the voice recognition and semantic recognition have reached the practical stage. With the popularity of cloud computing technology, a lot of service providers of the voice recognition based on cloud service combine the voice recognition and TV to get a TV controlled by voice. In the present solutions, a microphone pickup module is installed on the remote control unit to obtain the voice of the user, the voice is processed and sent to the cloud to recognize. Even a microphone array technology which can pick up a long-distance voice is used, a problem such as interference of the TV output sound and environment noise, and a problem such as that the non-control instruction voice of the user is recognized as a control instruction by mistake can affect the performance of the multimedia device.

SUMMARY OF THE INVENTION

The technical problem to be solved by the present invention is to provide a voice control system for a multimedia device.

The voice control system for the multimedia device is used to address the above problem. The voice control system for the multimedia device includes: an image sensing module configured to collect a user action image; an image recognizing module configured to determine a type or a status of a control instruction according to the user action image; a voice recognition status managing module configured to activate or suspend a voice recognition program according to a type of a the control instruction; a pickup module configured to collect a voice signal; a voice recognizing module configured to recognize the collected voice data to generate a control instruction; and the multimedia function module configured to execute the control instruction to provide a corresponding multimedia function to the user.

Preferably, the image recognition module is configured to compare the user action image with a preset image template and select a type of control instruction matching with the user action image; if the type of the control instruction matching with the user action image is found, the position of the user is asserted as the position of the target voice source, information of the position of the target voice, information of starting the voice recognition program and/or the type of the control instruction are sent to the voice recognition status managing module; if the type of control instruction matching with the user action image is not found, comparison failure information is sent to the voice recognition status managing module.

Preferably, the image recognition module is configured to play a human-computer interaction content, guide the user to make a motion until the motion matches with the preset image template.

Preferably, the pickup module is an array pickup module or at least one pickup sensor, the pickup sensor is regularly or irregularly arranged, the pickup sensor collects the voice signal emitted by the target voice source according to the limitations of the pickup direction and the pickup angle, digitizes the voice signal to generate voice data and send the voice data.

Preferably, the voice recognition status managing module sends a start instruction and the type of control instruction to the voice recognition module according to the received information of starting the voice recognition program to activate or wake up the voice recognition program, the information of the position of the target voice source is sent to the sound beam forming module, the multimedia function module is controlled to reduce a output volume of the multimedia device, the output volume of the multimedia device is restored to a normal level after the pickup module completes collecting the voice signal.

Preferably, the voice recognition module recognizes the voice data from the pickup module according to the start instruction and the type of control instruction from the voice recognition status managing module to generate a control instruction having the type of control instruction, the control instruction is sent to the multimedia function module.

Preferably, the voice recognition module presets a built in voice instruction dictionary in which a processed control instruction voice signal word model is stored;

the voice recognition module compares the voice data with a word model in a voice instruction dictionary, if a similarity between the voice data and a word model is greater than a preset threshold value, the voice data is asserted as a control instruction corresponding to the word model, the control instruction is sent to the multimedia function module.

Preferably, the voice recognition module includes a local voice recognition module and a cloud voice recognition module;

the local voice recognition module recognizes the voice data to form a control instruction having the type of control instruction, the control instruction is sent to the multimedia function module;

the cloud voice recognition module recognizes the voice data which cannot be recognized by the local voice recognition module to form a control instruction having the type of control instruction, the control instruction is sent to the multimedia function module.

Preferably, the multimedia function module executes the control instruction, searches automatically to obtain audio and video data through a search engine according to the control instruction, downloads and plays the audio and video data.

A voice control method for a multimedia device includes: collecting a user action image; determining a type or a status of a control instruction according to the user action image; asserting a position of a user who sends the user action image as a position of a target voice source, sending the position of the target voice source, determining a target user according to the position of the target voice source, the target user being an operator; activating or waking up a voice recognition program according to the type of the control instruction; sending the position of the target voice source, and reducing a output volume of the multimedia device; determining a pickup direction and a pickup angle according to the position of the target voice source; collecting a voice signal of the user according to limitations of the pickup direction and the pickup angle, digitizing the voice signal to generate voice data; recognizing the collected voice data to generate a control instruction; and executing the control instruction to provide a corresponding multimedia function to the user.

Preferably, the determining the type or the status of the control instruction according to the user action image, and asserting the position of the user who sends the user action image as the position of the target voice source, sending the position of the target voice source comprises:

comparing the user action image with a preset image template and selecting the type of the control instruction matching with the user action image;

if the type of the control instruction matching with the user action image is found, asserting the position of the user as the position of the target voice source, and sending information of the position of the target voice, information of starting the voice recognition program and/or the type of the control instruction; if the type of the control instruction matching with the user action image is not found, sending comparison failure information.

Preferably, the method further includes:

playing a human-computer interaction content to the user, guiding the user to make a motion until the motion matches with the preset image template.

Preferably, the collecting the voice signal emitted by the target voice source according to the pickup direction and the pickup angle, and generate the voice data comprises:

arranging at least one pickup sensor regularly or irregularly, collecting, by the at least one pickup sensor, the voice signal emitted by the target voice source according to the limitations of the pickup direction and the pickup angle, digitizing the voice signal to generate the voice data and sending the voice data.

Preferably, the activating or waking up the voice recognition program according to the type of the current control instruction; sending the position of the target voice source, reducing the output volume of the multimedia device comprises:

sending a start instruction and the type of the control instruction to activate or wake up the voice recognition program according to the received information of starting the voice recognition program, sending the information of the position of the target voice source, reducing the output volume of the multimedia device, restoring the output volume of the multimedia device to the normal level after the collecting of the voice signal is completed.

Preferably, the sending the start instruction and the type of control instruction to activate or wake up the voice recognition program according to the received information of starting the voice recognition program comprises:

recognizing the voice data according to the start instruction and the type of control instruction, and generate a control instruction having the type of the control instruction, and sending the control instruction.

Preferably, the recognizing the voice data according to the start instruction and the type of the control instruction to form the control instruction having the type of control instruction, and sending the control instruction comprises:

comparing the voice data with a word model in a voice instruction dictionary in which a processed control instruction voice signal word model is stored;

if a similarity between the voice data and at least one word model is greater than a preset threshold value, asserting the voice data as a control instruction corresponding to the word model, and sending the control instruction.

Preferably, the recognizing the voice data according to the start instruction and the type of control instruction to form a control instruction having the type of control instruction, and sending the control instruction includes:

recognizing the voice data locally to generate a control instruction having the type of the control instruction, sending the control instruction;

recognizing the voice data semantically which cannot be recognized locally to generate a control instruction having the type of the control instruction, sending the control instruction.

Preferably, the executing the control instruction to provide corresponding multimedia functions to the user includes:

executing the control instruction, searching automatically to obtain audio and video data through a search engine according to the control instruction, downloading and playing the audio and video data.

A computer readable storage medium configured to store computer executable instructions, the computer readable storage medium storing one or more computer executable instructions, the one or more computer executable instructions being executed by one or more processors to perform a voice control method for a multimedia device, the method includes:

collecting a user action image;

determining a type or a status of a control instruction according to the user action image; asserting a position of a user who sends the user action image as a position of a target voice source, sending the position of the target voice source, determining a target user according to the position of the target voice source, the target user being an operator;

activating or waking up a voice recognition program according to the type of the current control instruction;

sending the position of the target voice source, reducing a output volume of the multimedia device;

determining a pickup direction and a pickup angle according to the position of the target voice source;

collecting a voice signal of the user according to limitations of the pickup direction and the pickup angle, digitizing the voice signal to generate voice data;

recognizing the collected voice data to generate a control instruction; and executing the control instruction to provide a corresponding multimedia function to the user.

The image recognition technology, the voice recognition technology, and the storage medium of the computer are combined in the present invention, a free and convenient voice control which is not depended on a hand-held remote control unit and not limited to a close pickup device is achieved. The interference of the sound output by the multimedia device, the environment background noise, and a non-control instruction voice signal of the user to the control instruction voice recognition can be effectively avoided, thus the instruction of the user can be precisely recognized.

BRIEF DESCRIPTION OF THE DRAWINGS

Embodiments of the invention are described more fully hereinafter with reference to the accompanying drawings.

DETAILED DESCRIPTION OF THE EMBODIMENTS

In order to make the purpose, technical solutions and advantages of the present disclosure be understood more clearly, the present disclosure will be described in further details with the accompanying drawings and the following embodiments. It should be understood that the specific embodiments described herein are merely examples to illustrate the invention, not to limit the present disclosure.

Figure 1:
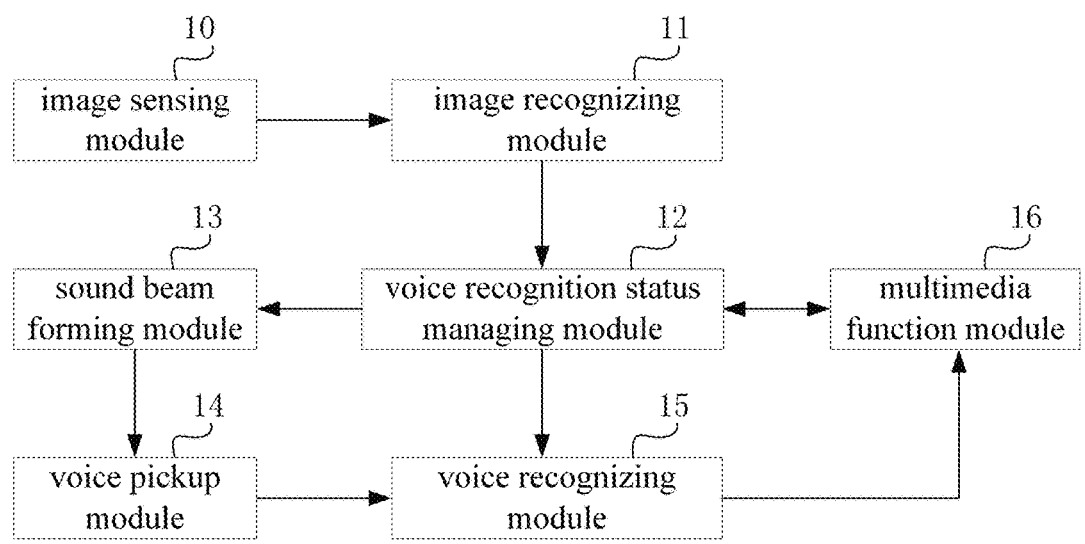
FIG. 1 is a block diagram of a voice control system for a multimedia device according to an embodiment.

Referring to a schematic block diagram of a voice control system for a multimedia device shown in FIG. 1, an embodiment of a multimedia device 1 includes an image sensing module 10 configured to collect a user action image; an image recognition module 11 configured to determine a type or a status of a control instruction according to the user action image; a voice recognition status managing module 12 configured to activate or wake up the voice recognition program according to the current control instruction; a pickup module 14 configured to collect voice data; a voice recognition module 15 configured to recognize the collected voice data to generate a control instruction; a multimedia function module 16 configured to execute the control instruction to provide a corresponding multimedia function to the user.

Figure 2:
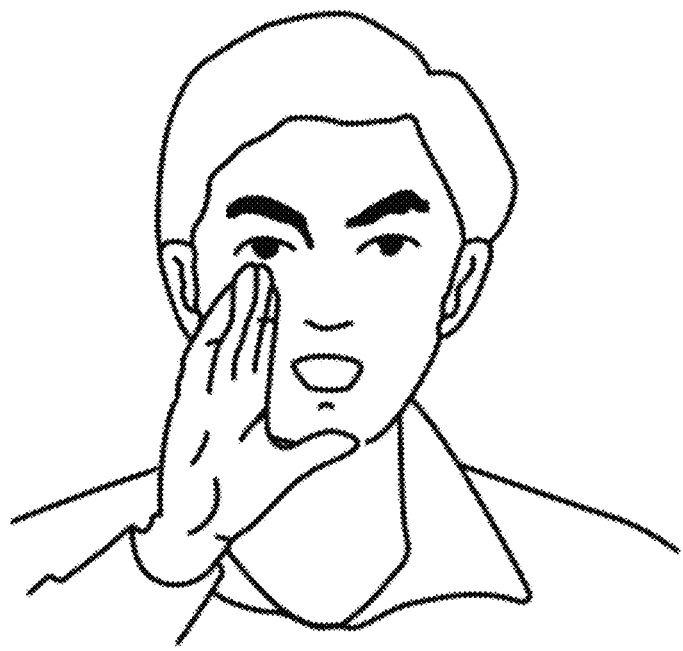
FIG. 2 is a schematic view of a preset image template Preferably.

Referring to a schematic preset image template shown in FIG. 2, an embodiment of the image recognition module 11 presets at least one image template, different types of control instructions correspond to different image templates. The user action image is compared with at least one image template, if an image template matching with the user action image is found, the user is recognized as a target voice source, then the voice of the user is a control instruction with a corresponding type of control instruction. If the comparison result is failure, i.e. an image template matching with the user action image is not found, the user action is not recognized as a control instruction, the voice recognition program is suspended.

Figure 3:
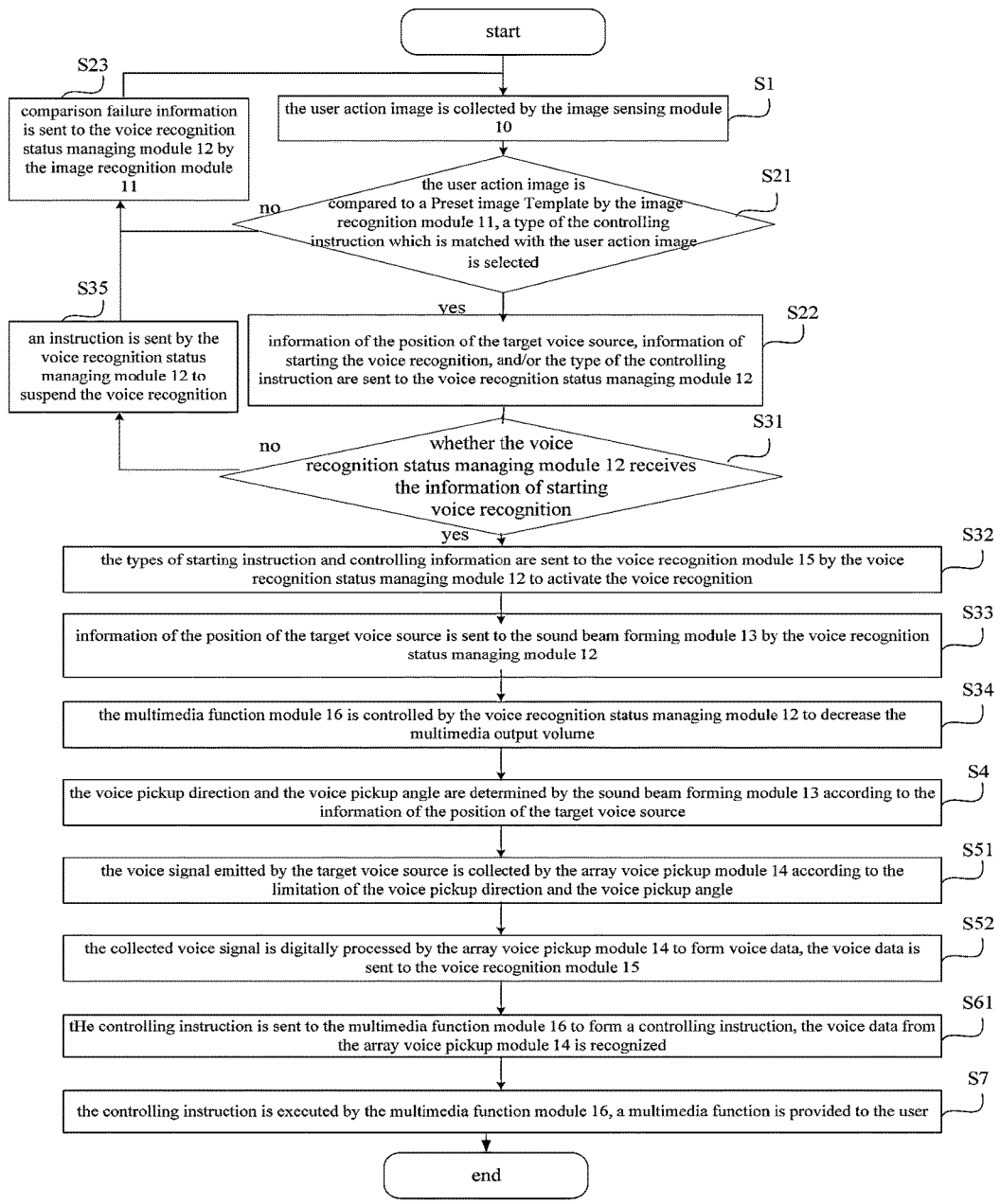
FIG. 3 is a specific processing flow chart of a voice control system for the multimedia device according to an embodiment.

Referring to a specific processing flow chart of a voice control system for the multimedia device shown in FIG. 3, the image recognition module 11 processes the user action image sent by the image sensing module 10, a processed result is compared with data of the preset image template, a type of the control instruction matching with the user action image is selected.

If the comparison result is that the type of the control instruction matching with the user action image is found, the position of the user is asserted as the position of the target voice source, information of the position of the target voice source, information of starting the voice recognition program and/or the type of the control instruction are sent to the voice recognition status managing module 12.

If the type of the control instruction matching with the user action image is not found, comparison failure information is sent to the voice recognition status managing module 12.

If a type of control instruction matching with the user action image is not found, comparison failure information is sent to the voice recognition status managing module 12.

In a preferred embodiment, the image recognition module 11 needs to train a specific user motion. For example, the multimedia device 1 plays human computer interactive content to the user, and guides the user to place his right hand to the mouth and make a propaganda-like motion until the motion matches a first image template corresponding to a type of the control instruction of "starting to voice control". For another example, the multimedia device 1 can guide the user to make a motion of covering the mouth by hand until the motion matches a second image template corresponding to a type of a preset control instruction of "muting".

An embodiment of the multimedia device 1 further includes a sound beam forming module 13, which determines a pickup direction and a pickup angle according to the position of the target voice source. A voice pickup array technology is combined to eliminate noise, such that the precision of the voice recognition is improved.

Figure 4:
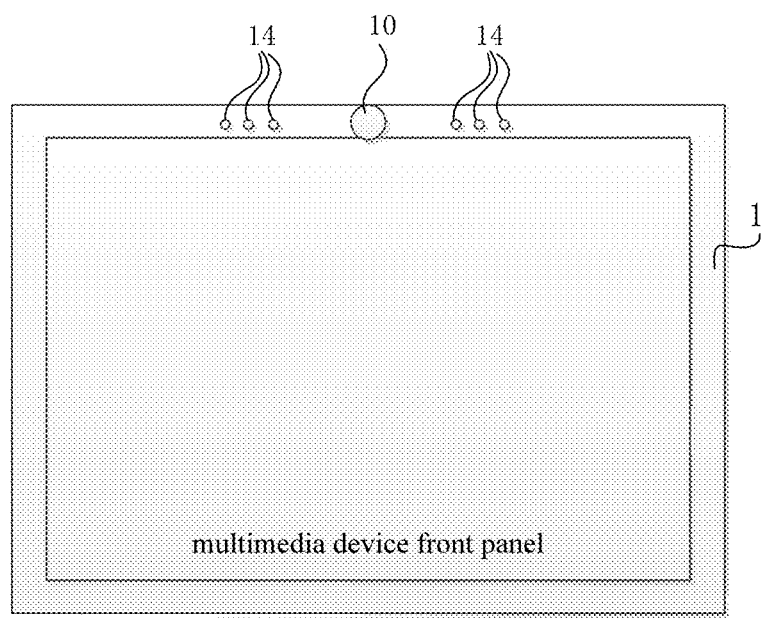
FIG. 4 is a schematic view of an array pickup module 14 according to an embodiment.

In the illustrated embodiment, the pickup module 14 is an array pickup module. The pickup module 14 includes at least one regularly arranged pickup sensor. A voice signal emitted by the target voice source is collected according to limitations of the pickup direction and the pickup angle. The voice signal is digitized, a background noise is eliminated, the voice data is generated and sent to the voice recognition module 15. Referring to a schematic view of an array pickup module 14 shown in FIG. 4, the array pickup module 14 includes a plurality of pickup sensors arranged according to a regular shape. For example, a plurality of pickup sensors are evenly and horizontally arranged on two sides of the image sensing module 10 according to an evenly spaced linear arrangement manner.

Referring to a specific processing flow chart of a voice control system for the multimedia device shown in FIG. 3, the sound beam forming module 13 determines a direction and a range of a sound beam main lobe of the voice signal collected by the array pickup module 14, i.e. a pickup direction and a pickup angle are determined, and accordingly, the array pickup module 14 is limited to collect the voice signal emitted by the target voice source. The common methods of forming sound beams include delay-accumulation method (conventional beam-forming method), adaptive beam forming method, and adaptive filtering method based on the post, the above three methods have advantages and disadvantages. The delay-accumulation beam method and the adaptive filtering method based on the post are applicable to eliminate incoherent noise and weak coherent noise, the adaptive beam forming method is applicable to eliminate coherent noise, and it has poor effects when eliminating incoherent noise and scattering noise. Practically, the environment often has coherent noise and incoherent noise, the pickup direction and the pickup angle are determined through determining the position of the target voice source by image recognition. Even if a plurality of TV viewers are in the image recognition range, only the voice signal emitted by the target user is recognized.

Referring to a specific processing flow chart of the voice control system for the multimedia device shown in FIG. 3. The voice recognition status managing module 12 is responsible to manage a recognition status of the voice control system for the multimedia device. When information of starting the voice recognition is received, a start instruction and a type of the control instruction are sent to the voice recognition module 15 to activate the voice recognition program, the position of the target voice source is sent to the sound beam forming module 13, the voice signal sent by the user is recognized as a control instruction, the control instruction is sent to the voice recognition module 15 by the array pickup module 14 and processed by the voice recognition module 15. When comparison failure information is received, a control instruction is sent to the voice recognition module 15 to suspend the voice recognition program.

Furthermore, the voice recognition status managing module 12 activates the voice recognition program, the multimedia function module 16 is controlled to reduce a output volume of the multimedia device. A smart TV is taken as an example, the output volume of the TV is controlled to be smaller than the strength of the voice signal of the target voice source. In general, the output sound of the smart TV is set to be mute, which can avoid the background noise of the TV disturbing the voice recognition program. If the voice recognition is completed or the voice recognition is suspended because of the comparison failure, the voice recognition module 15 is not started, the output sound of the smart TV is adjusted to a normal output volume, the voice signal of the user is neglected, which avoids the disturbances from unconscious voice commands.

In the illustrated embodiment, the voice recognition module 15 recognizes the voice data from the pickup module 14 to generate a control instruction having a type of control instruction, the control instruction is sent to the multimedia function module 16.

In the illustrated embodiment, the voice recognition module 15 presets a built-in voice instruction dictionary, the voice instruction dictionary stores a word model of the processed control instruction voice signal, the word model includes but not limited to "last channel", "next channel", "output volume up", "output volume down", "CCTV1", "Hunan Satellite TV" etc. The voice recognition module 15 compares the voice data to the word model in the voice instruction dictionary, if the similarity between the voice data and at least one word model is greater than a preset threshold value, the voice data is determined as a control instruction corresponding to the word model, the control instruction is sent to the multimedia function module 16.

In order to realize a complex voice recognition control instruction, the voice recognition module 15 further includes a local voice recognition module 151 and a cloud voice recognition module 152. The local voice recognition module 151 is configured to recognize and process simple control instructions, which include but not limited to changing channels, adjusting output volume, turning on and off. The cloud voice recognition module 152 is configured to recognize and process a complex control instruction which contains semantic recognition content, and it is realized through the cloud service of the voice recognition.

Referring to the specific processing flow chart of the multimedia device voice recognition system shown in FIG. 3, the local voice recognition module 151 recognizes the voice data and generates a control instruction having the type of the control instruction, the control instruction is sent to the multimedia function module 16.

The cloud voice recognition module 152 can be a service provider of the voice recognition with the semantic recognition ability, such as the online service provided by ANHUI USTC iFLYTEK CO., LTD. If the voice data of the user cannot be recognized by the local voice recognition module 152, i.e. the similarity between the voice data and all the word models in the voice instruction dictionary is smaller than the preset threshold value, the voice data is sent to the cloud voice recognition module 152 through network and semantic recognized to generate a control instruction having the type of the control instruction, the control instruction is sent to the multimedia function module 16.

Figure 5:
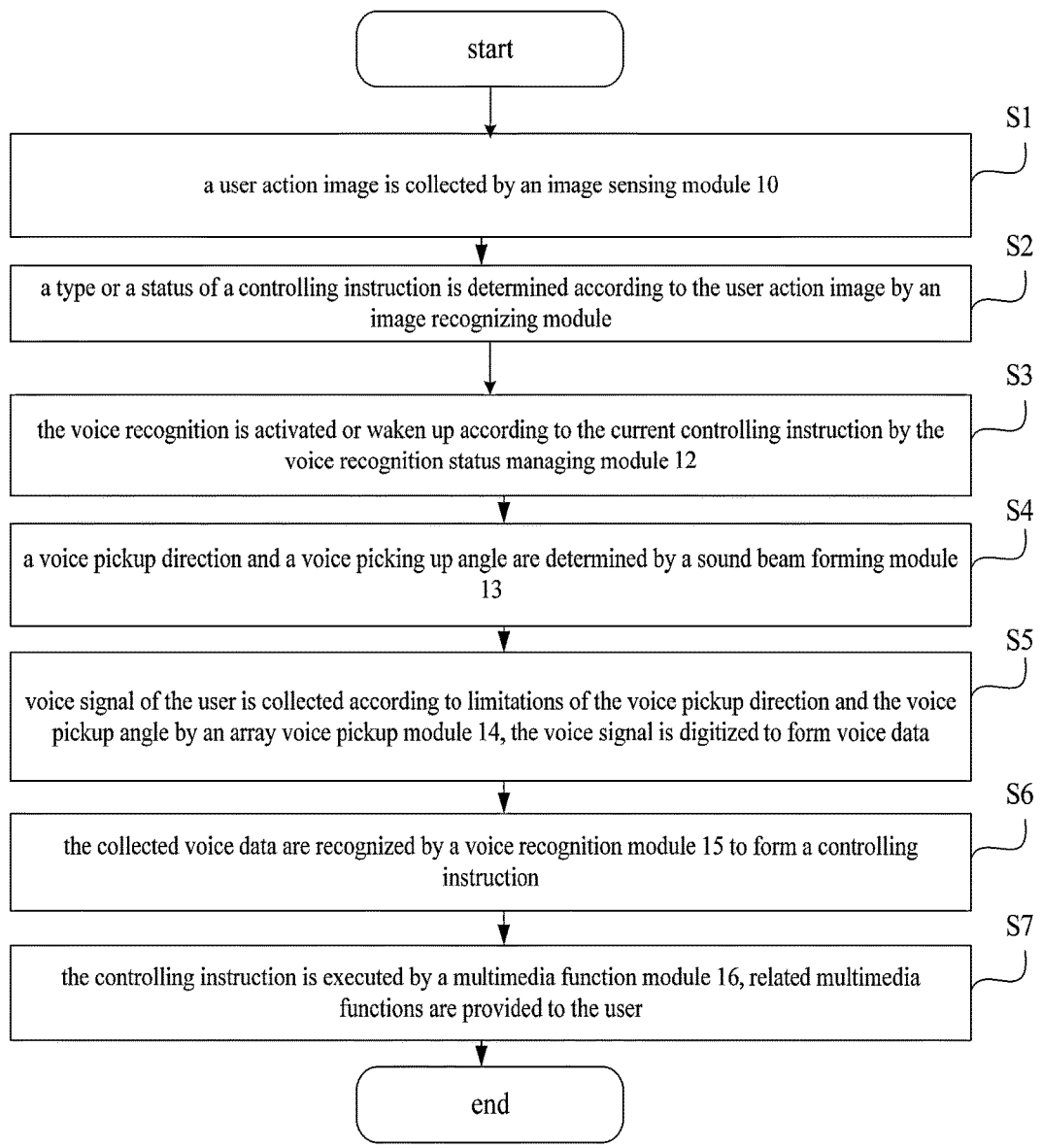
FIG. 5 is a basic processing flow chart of the voice control system for the multimedia device according to an embodiment.

A voice control method for a multimedia device is also provided in the present disclosure, referring to a basic processing flow chart of the voice control system for the multimedia device shown in FIG. 5, the method includes:

In step S1, a user action image is collected by an image sensing module 10;

In step S2, a type or a status of a control instruction is determined according to the user action image by an image recognizing module;

In step S3, the voice recognition is activated or waken up according to the current control instruction by the voice recognition status managing module 12;

In step S4, a pickup direction and a pickup angle are determined by a sound beam forming module 13;

In step S5, the voice signal of the user is collected according to limitations of the pickup direction and the pickup angle by an array pickup module 14, the voice signal is digitized to generate voice data;

In step S6, the collected voice data are recognized by a voice recognition module 15 to generate a control instruction;

In step S7, the control instruction is executed by a multimedia function module 16, related multimedia functions are provided to the user.

Referring to a specific processing flow chart of the voice control system for the multimedia device shown in FIG. 3, in an embodiment, the voice control method for the multimedia device includes:

In step S1, the user action image is collected by the image sensing module 10;

In step S21, the user action image is compared with a preset image template by the image recognition module 11, a type of the control instruction matching with the user action image is selected. If the comparison result is that the type of the control instruction matching with the user action image is found, then step S22 is executed. If the type of the control instruction matching with the user action image is not found, then step S23 is executed;

In step S22, the position of the user is asserted as the position of a target voice source by the image recognition module 11, information of the position of the target voice source, information of starting the voice recognition program, and/or the type of the control instruction are sent to the voice recognition status managing module 12;

In step S23, comparison failure information is sent to the voice recognition status managing module 12 by the image recognition module 11;

In step S31, the information is analyzed and received by the voice recognition status managing module 12, if the information is starting voice recognition program, step S32 is executed; if the information is the comparison failure information, step S35 is executed;

In step S32, the types of start instruction and controlling information are sent to the voice recognition module 15 by the voice recognition status managing module 12 to activate the voice recognition program;

In step S33, information of the position of the target voice source is sent to the sound beam forming module 13 by the voice recognition status managing module 12;

In step S34, the multimedia function module 16 is controlled by the voice recognition status managing module 12 to decrease the multimedia output volume;

In step S35, an instruction is sent by the voice recognition status managing module 12 to suspend the voice recognition program;

In step S4, the pickup direction and the pickup angle are determined by the sound beam forming module 13 according to the information of the position of the target voice source;

In step S51, the voice signal emitted by the target voice source is collected by the array pickup module 14 according to limitations of the pickup direction and the pickup angle;

In step S52, the collected voice signal is digitized by the array pickup module 14 to generate voice data, the voice data is sent to the voice recognition module 15;

In step S61, the voice data from the array pickup module 14 is recognized by the voice recognition module 15 according to the start instruction and the type of control instruction from the voice recognition status managing module 12 to generate a control instruction having the type of control instruction, the control instruction is sent to the multimedia function module 16;

In step S7, the control instruction is executed by the multimedia function module 16, a multimedia function is provided to the user.

In a specific embodiment, the image sensing module 10 of the smart TV 1 collects that a user A has a motion shown in FIG. 2 in a sensing range. The image recognition module 11 compares the user action image to a preset image template, if the user action image is matched with an image template corresponding to the type of the control instruction of "starting voice remote controlling", the position of the user A is asserted as the position of the target voice source, information of the position of the target voice source, information of starting the voice recognition program and/or the type of the control instruction are sent to the voice recognition status managing module 12. The voice recognition status managing module 12 sends the start instruction and the type of control instruction to the voice recognition module 15 according to the received information of starting voice recognition to activate the voice recognition program. The voice recognition status managing module 12 sends the information of the position of the target voice source to the sound beam forming module 13, which ensures that even there are several TV viewers in the image sensing and recognizing range, only the user A is a target user, only the voice signal of the user A can be recognized. The sound beam forming module 13 determines the pickup direction and the pickup angle according to the information of the position of the target voice source. The array pickup module 14 collects the voice signal of "Hunan satellite TV" according to the limitations of the voice pickup direction and the pickup angle, then the voice signal is digitized to generate voice data, the voice data is sent to the voice recognition module 15. The voice data is recognized by the voice recognition module 15, if the similarity between the voice data and a word model is greater than the preset threshold value, a control instruction of "tuning the TV to Hunan satellite TV channel" is generated and sent to the multimedia function module 16. The multimedia function module 16 executes the control instruction and tunes the TV to Hunan satellite TV channel.

Figure 6:
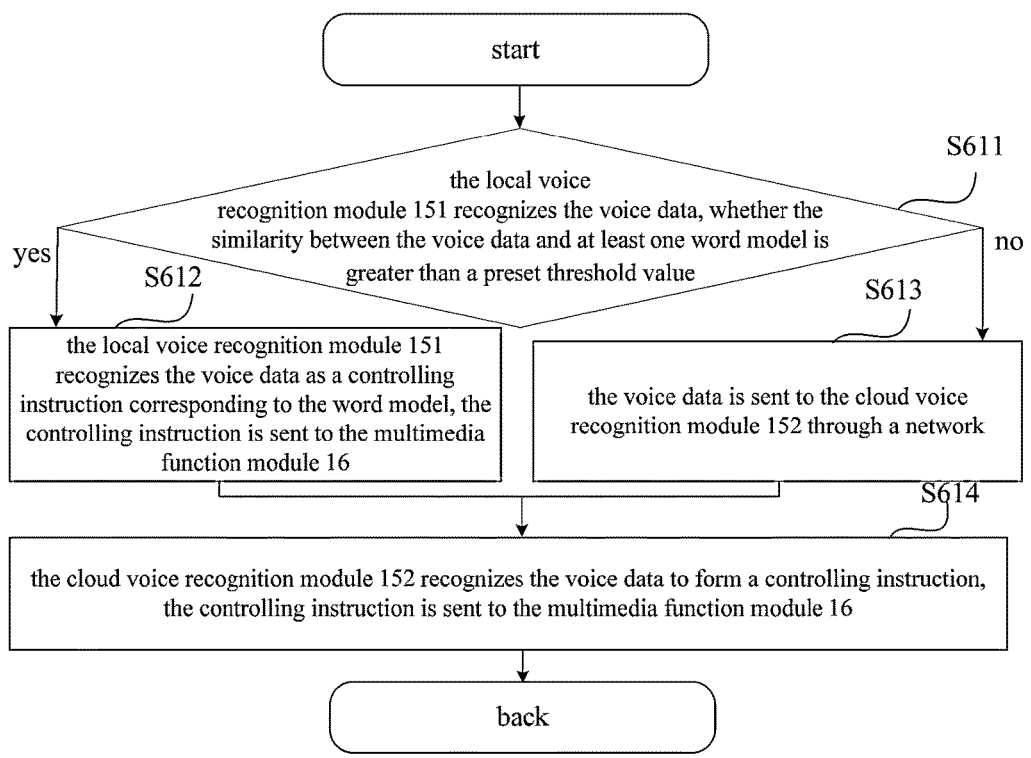
FIG. 6 is a specific processing flow chart of a voice recognition module 15.

A voice control method for the multimedia device is also provided in an embodiment. Referring to the specific flow chart of the voice recognition module 15 shown in FIG. 6, the voice recognition module 15 includes a local voice recognition module 151 and a cloud voice recognition module 152, the voice recognition module 15 presets a voice instruction dictionary. The voice control method for the multimedia device includes:

In step S611, the local voice recognition module 151 recognizes the voice data and compares the voice data to a word model in the voice instruction dictionary, if the similarity between the voice data and at least one word model is greater than a preset threshold value, step S612 is executed, if not, step S613 is executed;

In step S612, the local voice recognition module 151 determines the voice data as a control instruction corresponding to the word model, the control instruction is sent to the multimedia function module 16;

In step S613, the voice data is sent to the cloud voice recognition module 152 through network;

In step S614, the cloud voice recognition module 152 recognizes the voice data to generate a control instruction, the control instruction is sent to the multimedia function module 16.

In a specific embodiment, step S1 to step S51 are the same as that in the above embodiment. The array pickup module 14 collects the voice signal of "playing a song of Andy Lau" from the user A and digitizes the voice signal to generate voice data, the voice data is sent to the voice recognition module 15. The voice data is recognized by the local voice recognition module 151 of the voice recognition module 15, the voice data is compared with the word model in the voice instruction dictionary, the similarity between the voice data and all word models in the voice instruction dictionary is smaller than the preset threshold value, the voice data is sent to the cloud voice recognition module 152 through the network. The cloud voice recognition module 152 recognizes the voice data and generate a control instruction of "playing a song of Andy Lau" according to the voice data of the user, the control instruction is sent to the multimedia function module 16. The multimedia function module 16 executes the control instruction and searches a song of Andy Lau through a search engine, the video and audio data of the song are downloaded and sent to a music playing module in the smart TV 1, the audio and video data are played.

The image recognition technology, the voice recognition technology, and the storage medium of the computer are combined in the illustrated embodiment, a free and convenient voice control which is not depended on a hand-held remote control unit and not limited to a close pickup device is achieved. The interference of the sound output by the multimedia device, the environment background noise, and a non-control instruction voice signal of the user to the control instruction voice recognition can be effectively avoided, the instruction of the user can be precisely recognized, thus several users can control the multimedia device jointly or separately.

The person skilled in the art should understand that that all of or a part of processes in the method according to the embodiments may be implemented by a computer program instructing relevant hardware. The program may be stored in a computer readable storage medium. When the program is executed, the processes of the method according to the embodiments of the present invention are performed. The storage medium may be a magnetic disk, an optical disc, a read-only memory (ROM) or a random access memory (RAM).

Although the present invention has been described with reference to the embodiments thereof and the best modes for carrying out the present invention, it is apparent to those skilled in the art that a variety of modifications and changes may be made without departing from the scope of the present invention, which is intended to be defined by the appended claims.

What is claimed is:

1. A voice control system for a multimedia device comprising a processor and a memory, said memory containing instructions executable by said processor to:
   train a user by playing human-computer interaction content to the user and guiding the user to make a motion until the motion matches with a preset image template;
   while a voice recognition program is not active or is asleep, collect the motion as a user action image with an image sensor;
   compare the user action image with the preset image template and select a type of control instruction matching with the user action image, and if the type of control instruction matching with the user action image is found:
      assert the position of the user as the position of a target voice source;
      determine a position of the user who sends the user action image as a position of the target voice source;
      in response to matching the type of control instruction with the user action image, send a start instruction and activate or wake up the voice recognition program according to the type of control instruction;
      reduce an output volume of the multimedia device;
      determine a pickup direction and a pickup angle according to the position of the target voice source;
      collect a voice signal of the target voice source and digitize the voice signal to generate voice data according to the pickup direction and the pickup angle using an array of pickup sensors that are evenly arranged on sides of the image sensor;
      restore the output volume of the multimedia device to a normal level after collecting the voice signal;
      when the voice data is simple, locally recognize the voice data by the voice recognition program and generate a control instruction;
      when the voice data is complex and cannot be locally recognized, send the voice data, through the network, to a cloud voice recognition module, recognize the voice data, and generate the control instruction by the cloud voice recognition module, and receive, through the network, the control instruction from the cloud voice recognition module;
   and
   execute the control instruction to provide a corresponding multimedia function to the user.

2. The voice control system for the multimedia device according to claim 1, wherein the voice control system is operative to play a human-computer interaction content to guide the user to make a motion until the motion matches with the preset image template.

3. The voice control system for the multimedia device according to claim 1, wherein the array of pickup sensors collect the voice signal emitted by the target voice source according to the limitations of the pickup direction and the pickup angle.

4. The voice control system for the multimedia device according to claim 1, wherein the voice control system is operative to:
   recognize the voice data according to the start instruction and the type of control instruction, and
   generate the control instruction.

5. The voice control system for the multimedia device according to claim 4, wherein the voice control system presets a built in voice instruction dictionary in which a processed control instruction voice signal word model is stored, the voice control system is operative to:
   compare the voice data with a word model in the voice instruction dictionary,
   if a similarity between the voice data and the word model is greater than a preset threshold value, assert the voice data as a control instruction corresponding to the word model.

6. The voice control system for the multimedia device according to claim 1, wherein the voice control system executes the control instruction, searches automatically to obtain audio and video data through a search engine according to the control instruction, downloads and plays the audio and video data.

7. A voice control method for a multimedia device, comprising:
   training a user by playing human-computer interaction content to the user and guiding the user to make a motion until the motion matches with a preset image template;
   collecting a user action image while a voice recognition program is not active or awake;
   comparing the user action image with the preset image template and selecting a type of control instruction matching with the user action image;
   if the type of the control instruction matching with the user action image is found, asserting a position of the user as a position of a target voice source;
   determining the user according to the position of the target voice source, the user being an operator;
   in response to finding the type of control instruction that matches the user action image, sending a start instruction and activating or waking up the voice recognition program according to the type of the control instruction;

sending the position of the target voice source, and reducing an output volume of the multimedia device;

determining a pickup direction and a pickup angle according to the position of the target voice source;

collecting a voice signal of the user according to limitations of the pickup direction and the pickup angle, and digitizing the voice signal to generate voice data;

restoring the output volume of the multimedia device after the collecting of the voice signal is completed;

when the voice data is simple, locally recognizing the voice data by the voice recognition program and generating a control instruction;

when the voice data is complex and cannot be locally recognized, sending the voice data, through the network, to a cloud voice recognition module, recognizing the voice data, and generating the control instruction by the cloud voice recognition module, and receiving, through the network, the control instruction from the cloud voice recognition module; and executing the control instruction to provide a corresponding multimedia function to the user.

8. The voice control method for the multimedia device according to claim 7, wherein collecting the voice signal emitted by the target voice source according to the pickup direction and the pickup angle, and generating the voice data comprises:

arranging at least one pickup sensor regularly or irregularly, collecting, by the at least one pickup sensor, the voice signal emitted by the target voice source according to the limitations of the pickup direction and the pickup angle, and digitizing the voice signal to generate the voice data and sending the voice data.

9. The voice control method for the multimedia device according to claim 7, wherein sending the start instruction and the type of control instruction to activate or wake up the voice recognition program according to the received information of starting the voice recognition program comprises:

recognizing the voice data according to the start instruction and the type of control instruction, generating a control instruction having the type of the control instruction, and sending the control instruction.

10. The voice control method for the multimedia device according to claim 9, wherein recognizing the voice data according to the start instruction and the type of the control instruction to form the control instruction having the type of control instruction, and sending the control instruction comprises:

comparing the voice data with a word model in a voice instruction dictionary in which a processed control instruction voice signal word model is stored;

if a similarity between the voice data and at least one word model is greater than a preset threshold value, asserting the voice data as a control instruction corresponding to the word model, and sending the control instruction.

11. The voice control method for the multimedia device according to claim 9, wherein recognizing the voice data according to the start instruction and the type of control instruction to form a control instruction having the type of control instruction, and sending the control instruction comprises:

recognizing the voice data locally to generate the control instruction having the type of the control instruction, sending the control instruction;

recognizing the voice data semantically which cannot be recognized locally to generate the control instruction having the type of the control instruction, and sending the control instruction.

12. The voice control method for the multimedia device according to claim 7, wherein executing the control instruction to provide a corresponding multimedia function to the user comprises:

executing the control instruction, searching automatically to obtain audio and video data through a search engine according to the control instruction, and downloading and playing the audio and video data.

* * * * *